United States Patent [19]

Lloyd et al.

[11] 3,733,587

[45] May 15, 1973

[54] UNIVERSAL BUFFER INTERFACE FOR COMPUTER CONTROLLED TEST SYSTEMS

[75] Inventors: Raymond A. Lloyd, Laurel; Emil D. Arle, Fallston; Thomas A. Keller, Randallstown; Robert Martinez, Baltimore, all of Md.

[73] Assignee: Westinghouse Electric Corporation, Pittsburgh, Pa.

[22] Filed: May 10, 1971

[21] Appl. No.: 141,640

[52] U.S. Cl. ............ 340/172.5
[51] Int. Cl. ............ G06f 11/00
[58] Field of Search ............ 340/172.5; 235/157; 324/73

[56] References Cited

UNITED STATES PATENTS

| | | | |
|---|---|---|---|
| 3,585,599 | 6/1971 | Hitt et al. | 340/172.5 |
| 3,518,413 | 6/1970 | Holtey | 340/172.5 |
| 3,405,258 | 10/1968 | Godoy et al. | 340/172.5 X |
| 3,311,890 | 3/1967 | Waaben | 340/172.5 |

*Primary Examiner*—Raulfe B. Zache
*Assistant Examiner*—Mark Edward Nusbaum
*Attorney*—F. H. Henson

[57] ABSTRACT

A testing system wherein a digital computer controls programmable testing devices which supply signals to, and receive signals from, a unit under test. Buffer interface equipment is connected to three input/output channels of the computer and includes a plurality of storage registers connected to the various programmable test devices. Information to be supplied to the test devices is received via one input/output channel and placed into storage. Test results are also placed into storage and transmitted back to the computer for analysis via a second channel. The third channel contains address information for selecting which storage registers receive or transmit the digital signals.

7 Claims, 8 Drawing Figures

Patented May 15, 1973

3,733,587

5 Sheets-Sheet 2

UNIVERSAL BUFFER INTERFACE FOR COMPUTER CONTROLLED TEST SYSTEMS

BACKGROUND OF THE INVENTION

1. Field of the Invention

Computer controlled test systems.

2. Description of the Prior Art

In various fields, such as in the manufacture of electronic circuits, there is a requirement that the finished product be adequately tested for operability. Very often, for complete circuitry, the unit under test requires so much of a tester's time that the test costs more than the unit itself. Accordingly, testing systems have been built which utilize programmable testing devices which are connected to, and are set up by, a small digital computer.

Some testing devices may supply signals or stimuli to the unit under test. These programmable devices include such things as power supplies, oscillators, synthesizers, function generators, pulse generators, to name a few. Programmable devices utilized for measurement functions include such things as wave analyzers, noise analyzers, digital voltmeters, and frequency meters, all of these devices, both the stimulus devices and the measurement devices, being commercially available items.

The programmable devices must be instructed to set up to certain ranges, depending upon the tests to be performed, they must be instructed to provide certain stimuli and to read certain signals in accordance with the test program run by the computer. The devices are connected to the input/output (I/O) channels of the computer. For a typical testing operation the programmable devices may require 40 to 50 I/O channels of the computer, depending upon the number of bits per word utilized by the computer. For example, for a 16 bit word a programmable power supply may require three output channels (each channel having a 16 bit output) a pulse generator may require four output channels and a wave analyzer may require ten output channels. Since the commercially available programmable devices do not include any sort of storage, an input/output panel having storage capabilities must be supplied for the computer. With a single testing station, the computer may be physically located near the station or it may be incorporated into the same cabinetry as the programmable devices.

Very often, several test sets may be located throughout a plant and a centralized computer, with the addition of more I/O channels, may be utilized for controlling the programmable devices by means of long cabling. In such instances, two wires are generally used per bit in the cabling, for noise cancellation purposes and the cost of such arrangement becomes excessive. For example, a typical output channel may be several hundred dollars and if the test sets having the programmable devices are positioned, for example, 1000 feet away from the computer, the cost of wire alone may be hundreds of thousands of dollars.

One test system which utilizes only three I/O channels of a computer is described in *Electronics* of July 1970 beginning at page 71. The test system described utilizes the computer in conjunction with custom designed circuitry to duplicate standard test instruments. Although the wiring requirements are reduced, the system requires custom-made units, each containing its own register and decoding networks, not readily available. If one of the units provided has a malfunction, it cannot be simply replaced by a commercially available unit but must be redesigned and rebuilt.

The present invention provides a universal piece of apparatus which can be used with large or mini-computers and with any type of commercially available programmable test devices, and, accordingly, the apparatus is usable with a tremendous variety of different testing systems. The apparatus has the capability of easily and inexpensively expanding to accommodate a greater number of programmable test devices with the simple addition of identical and standard plug-in units.

SUMMARY OF THE INVENTION

A buffer interface is provided for computer controlled testing operations utilizing digitally programmable test devices. The buffer interface equipment includes two inputs and one output connected respectively to only three I/O channels of the computer. The apparatus includes a first section having a plurality of first storage registers for receiving information from the computer at the first connection and for transmitting this information to predetermined programmable test devices of the testing system. A second section, including a second plurality of storage registers, receives the results of the test operations from the programmable test devices and communicates this back to the computer for data processing. Each of the test devices is assigned and operably connected to one or more of the storage registers.

In order to determine into which storage register information is to be placed, and from which storage register information is to be extracted, there is provided a decode network which receives address information at another input connected to one of the three I/O channels of the computer. The centralized decode network in response to an address signal is operable to selectively choose a single storage register out of the first and second plurality of storage registers. A control and display section serves as the man-machine interface whereby control may be from the computer, or an operator who can easily command certain modes of operation and enter various data as desired.

The apparatus includes a plurality of line receivers and a line driver which function to amplify digital signals provided by the computer along the cabling connecting the apparatus with the computer, as well as to filter and shape the input pulses. By this means, the apparatus may be physically located at relatively long distances from the control computer.

DESCRIPTION OF THE PREFERRED EMBODIMENT

Figure 1:
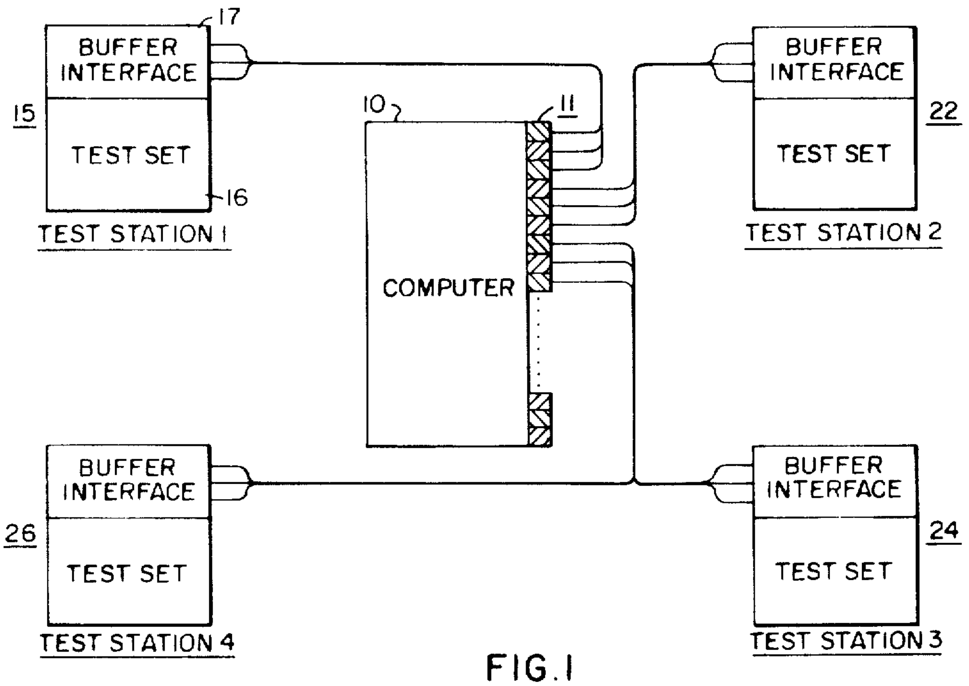
FIG. 1 is a block diagram illustrating a computer controlled test system having multiple test stations.

In FIG. 1, there is shown a central computer 10 having a plurality of I/O channels 11. A typical computer which may be used is the Prodac 2000 which is described in the Prodac 200 Computer System Manual, Copyrighted Dec. 1970, published by Westinghouse Electric Corp. Computer and Instrumentation Division. The first three I/O channels are connected to a first test station 15 having a test set section 16 and a buffer interface section 17. The test set 16 includes various displays and programmable test devices which are communicative with the computer 10 by way of the interface 17. If desired, another three separate I/O channels may be connected with a second test station 22 or three I/O channels may be connected in parallel to a plurality of test stations such as 24 and 26. In an actual operation, the computer 10 may be physically located at one position in a facility and the test stations may be physically disposed at different locations in the facility. The test stations may all provide for the same tests or different tests and by virtue of the interface equipment, the test set at any test station, may be readily changed to provide for a different test procedure. The interface unit also allows an enormous saving in the cost of the wiring connecting the computer to the test stations as well as a significant savings in the cost of I/O channels. A typical test station is illustrated in somewhat more detail in FIG. 2, to which reference is now made.

The test station 15 is communicative with the computer 10 by way of three I/O channels operatively connected by lines 38, 39, and 40 to first, second, and third connections 42, 43, and 44, respectively. Each line 38, 39, and 40 contains a plurality of wires and to aid in the elimination of noise effects, it is preferable that two wires be provided for each bit of information transmitted. The computer operates with computer words of a certain bit length. By way of example, and not by way of limitation, let it be assumed, that the computer word in the present case is 16 bits, and accordingly, each output channel provides for a 16 bit word. Each line 38, 39, and 40, carrying two wires per bit, would then have 32 wires each, or a total of 96 wires connecting the computer 10 with the test station 15. By way of distinction, in the absence of the buffer interface unit, the computer I/O channels would be directly connected to the programmable devices and a typical test system would require between one and 2000 wires for the communication. Multiplied by the distance between the computer and test station and the cost of wire per foot, and the cost of each I/O channel, utilization of the present invention results in an enormous cost savings.

Connectors 42 and 43 form first and second inputs by which the buffer interface 17 receives information from the computer 10. The information transmitted via lines 38 and 39 are provided to line receiver means 48 operable to amplify, filter and shape the binary pulses being provided thereby allowing the test station 15 to be physically located at a relatively great distance from the computer 10 without any danger of signal degradation. The buffer interface 17 is communicative with various programmable test devices of the test set 16, the devices taking the form of one or more stimulus devices 50 and one or more measurement devices 52. The command to set the particular devices 50 and 52 to a particular range, to a particular mode of operation, to perform a certain operation, etc., emanates from the computer, is received by line receivers 48 and entered into preselected ones of a first plurality of storage registers constituting the data register section 54.

The selection of the particular storage registers is accomplished by means of the decode network 56 which receives address information from the computer via the second I/O channel. After the programmable devices 50 and 52 have been set up, a test is performed on the unit under test 60, which makes operative connection with the test station by means of the interface section 61.

Various electronic circuitry to be tested include a large plurality of input and output connections. In order to selectively choose which of the plurality of input connections are to receive certain stimuli and which outputs are to be measured, there is included a switching matrix 63 which sets up the proper signal path to that portion of the unit under test by means of an instruction from the data register section 54, provided by the computer.

The results of a predetermined test as provided by the measurement devices 52, are analyzed by the computer and a result of the analysis is provided such as by a display or computer readout. The transfer of the results back to the computer is accomplished by means of a second plurality of storage registers of the data transfer register section 66.

By direct wire connection, the measurement results are entered into preselected storage locations in the second section 66 and by means of the decode network 56 the information is transmitted to the third I/O channel of the computer by the line driver section 67 which provides the necessary amplfication of signals and which is wired to the third connection 44 constituting an output.

Under certain circumstances, the unit under test 60 is a digital circuit which requires the provision of a digital signal. Under such circumstances, the digital signal may be provided directly to the unit under test from one of the data registers 54 such as by line 69, which bypasses all the stimulus devices 50 and the switching matrix 63. The digital response of the unit may then bypass the switching matrix 63 and measurement devices 52 by direct transfer to one of the data transfer registers 66 such as by line 70.

Very often, a test operator may want to intervene in the test operation such as to stop it, to retest a unit under test, to instruct the computer to print out all data or just those measurements falling out of predetermined limits, for example. Very often, the operator may want to insert his own data and perform a portion of the test, in place of the computer. For these purposes, there is provided a control and display section 75 communicative with various portions of the buffer interface, as will be described.

Figure 2:
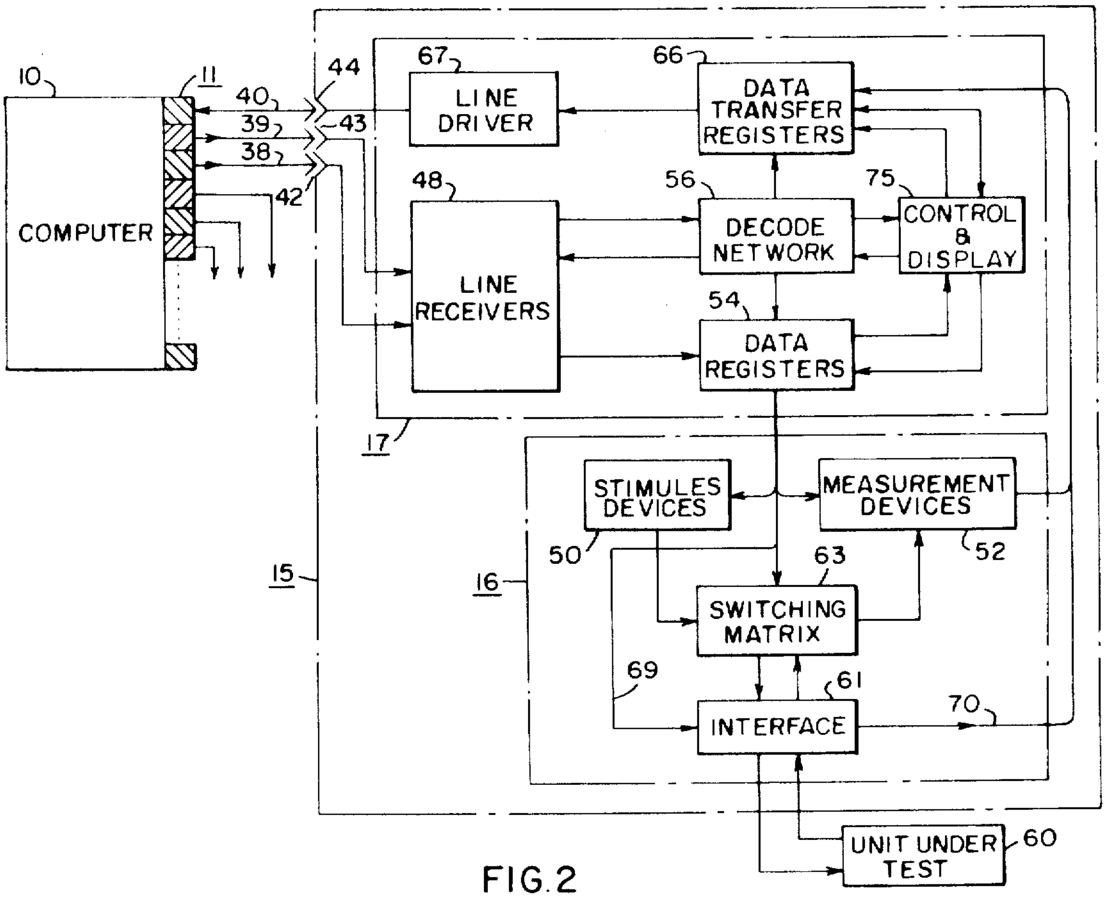
FIG. 2 is a block diagram illustrating one computer controlled test station and incorporating the present invention.
Figure 3:
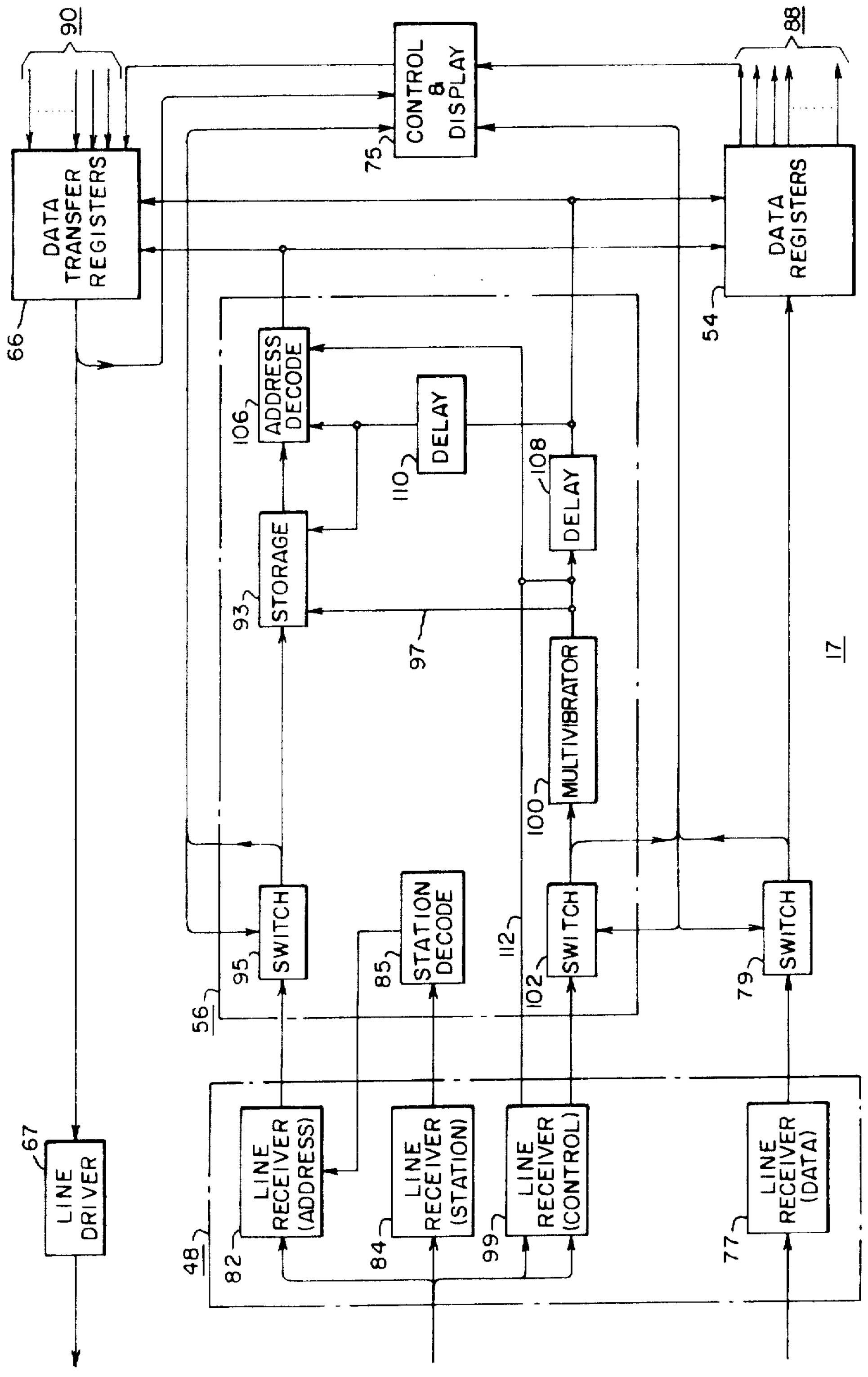
FIG. 3 is a block diagram illustrating the buffer interface apparatus of FIG. 2 in somewhat more detail.

FIG. 3 illustrates the buffer interface 17 of FIG. 2 in somewhat more detail. The line receiver means 48 more particularly includes a first line receiver 77, operatively connected to the first input 42 (FIG. 2) for receiving data information from the computer and providing it to the data registers 54 by way of switch means 79. The data, representing for example, an instruction or command for setting up a programmable test device is provided to each and every storage register of the register section 54 but will only be allowed to enter a preselected one of them, as indicated by the decode network 56. The address for the particular storage register is received by line receiver 82. For a multi-station test operation, however, where the lines are paralleled, as test stations 24 and 26 in FIG. 1, both the interface units thereof will be receiving the same information. In order to determine which interface unit is to be communicative with the computer, there is a station address provided by the computer and received by the station line receiver 84, the output of which is decoded in the station decoder 85. If that particular station is the station which is to receive the information, the station decoder 85 will provide an output signal enabling the address line receivers to pass the storage register address to the decode network 56. If no enabling output signal is provided, it will mean that a different buffer interface is receiving the computer information.

The first section of storage registers 54 has a plurality of output lines 88, each line being connected to a respective storage register and each line including, for the example given, 16 wires, one for each bit. The lines are connected, as illustrated in FIG. 2, to the stimulus devices 50, the measurement devices 52, the switching matrix 63, the control and display section 75 and to the interface unit 61.

The second section of storage registers 66 has a plurality of multi-wire input lines 90 each connected in a predetermined manner to a particular measurement device 52 or interface 61, and which provide predetermined storage registers with the result of a test. The information contained in the particular storage register is then communicated to the computer by way of line driver 67 in response to the proper addressing from the decode network 56.

In the decoding of address information, the bits representing a particular storage register address, as designated by the computer, are placed into storage 93 by way of the address line receiver 82 and switch means 95. In order to insure that any generated noise has settled, the loading of the address into the temporary storage 93 is accomplished after a slight time delay by the provision of an enabling or load signal on line 97. This signal is conveniently provided by the computer on the I/O channel providing address information and is received by a control line receiver 99, the output of which is provided to a one shot multivibrator 100 through switch means 102. With the load signal being transmitted with the address information, the address signal arrives at the temporary storage 93 at substantially the same time that the load signal arrives at the multivibrator 100. However, the address will not be loaded until after the multivibrator has been triggered.

The address decode section 106 is responsive to the address information in the temporary storage 93 for providing an address signal to the preselected storage register in either the data register section 54 or data transfer register section 66. The enabling of the selected register is accomplished by an additional signal, $t$, provided a very short time after the address signal, to give it a chance to settle down. This signal $t$ may be derived from the previously mentioned load signal by the provision of delay means 108 which delays the signal from multivibrator 100 until the address signal is being provided.

After the particular storage register has been enabled to receive data from the computer, as in section 54, or to transmit data back to the computer as in section 66, the temporary storage 93 and address decode section 106 are cleared for a subsequent address. This is accomplished by delaying the output signal from delay means 108 with a second delay means 110, the output signal of which is provided to both temporary storage 93 and address decode 106.

In the example given, the computer operates with a 16 bit word. The address for a preselected storage register may utilize eight bits of a word, the designation for a particular test station may utilize four bits of the word, the load signal may occupy one bit of the same word, leaving three bits of unused information. With eight bits designating a particular address, there are 256 possible address locations and accordingly 256 storage registers which may be utilized. With four of the bits being used to identify the appropriate buffer interface unit to receive information, up to 16 of these units can be time-shared by one computer. For some operations, it may be desirable to clear all the storage registers, and accordingly, one of the unused bits may be received by the control line receiver 99 and provided such as by line 112 to the address decode section 106 which, in response thereto, will address all of the storage registers in the system. It is evident that other control features may be provided with the unused bits or that the storage capacity may be expanded with larger computer words or utilizing more bits per storage register address and less bits per station address.

The control and display section 75 not only displays what information is stored in which registers, but also allows operator insertion of selected data into selected registers, in place of the computer. The switch means 79, 95, and 102, which may physically be located in the control and display section 75, are selectively operable to pass computer information or operator information to the various registers. The output of switch means 79 is communicative with the control and display means 75 in order to indicate what information is being stored and the output of switch means 95 is communicative, to indicate which storage register is being addressed. The control section is communicative with multivibrator 100 to enable the operator to manually load a selected address and the data transfer register section 66 is communicative, in order to display information generated by the programmable test devices. In order to allow the operator to communicate with the computer operative connection is made between the control and display section 75 and the data transfer register section 66 for transmitting an operator signal first into storage and then to the computer. In this regard, the computer program will insure that the computer periodically examines the data transfer register into which the operator places his communication.

Figure 4:
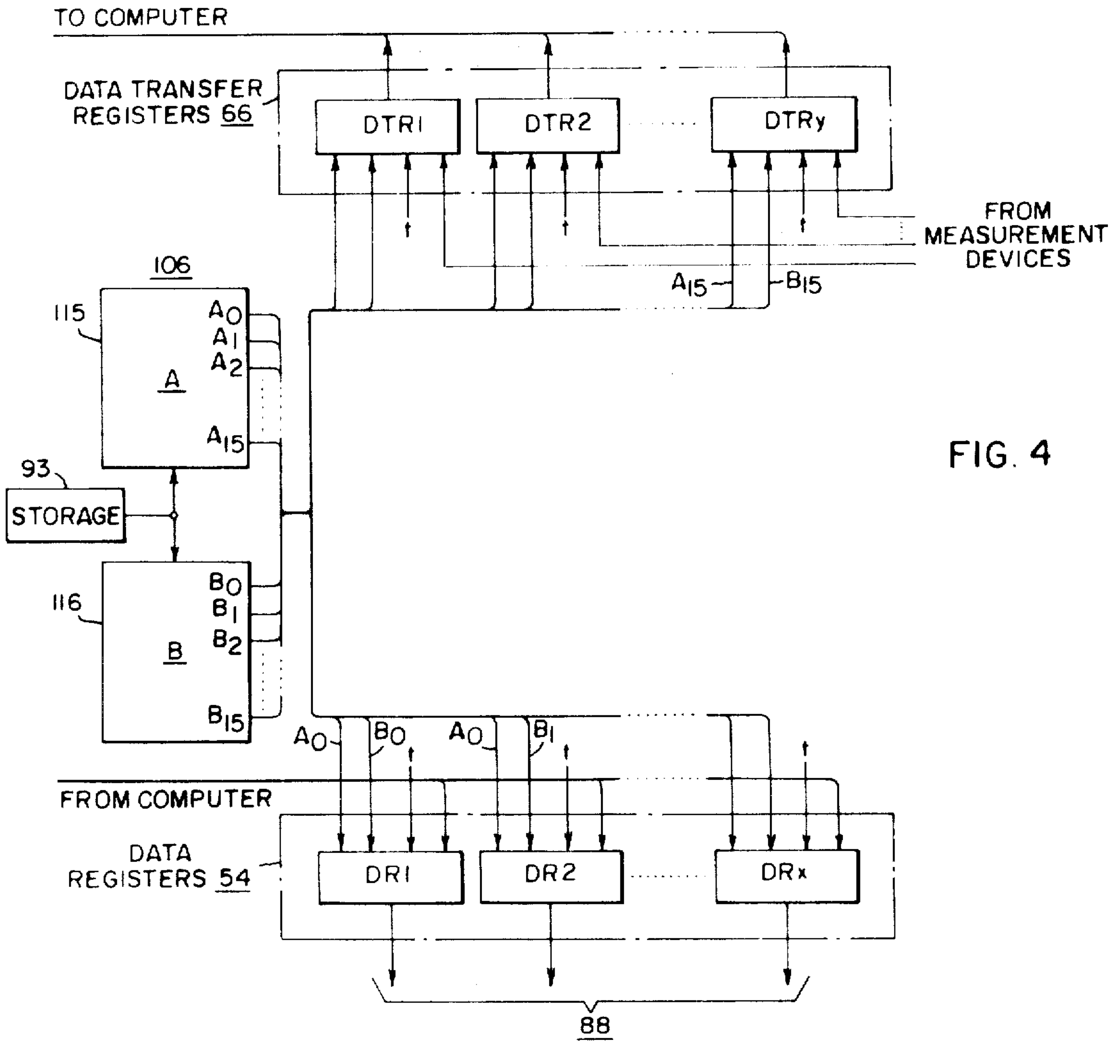
FIG. 4 is a block diagram illustrating the decode network of FIG. 3 in more detail.

A variety of circuits may be chosen to perform the address decoding function, and one such arrangement is illustrated in FIG. 4. The computer designated address in temporary storage 93 is provided to the address decode circuitry 106 which includes a first or A section 115 and a second or B section 116. In response to the digital address word in storage, section 115 will provide an output pulse on one of 16 output lines designated $A_0$ to $A_{15}$ and section 116 will similarly provide an output pulse on one of its output lines designated $B_0$ to $B_{15}$. All of the data registers 54 and all of the data transfer registers 66 are connected to these A and B output lines such that each storage register receives a unique A and B address signal different than the other storage registers. By way of example, the data registers 54 are designated DR1, DR2 . . . DRx, with register DR1 receiving the $A_0$ $B_0$ combination, DR2 receiving the $A_0$ $B_1$ combination, and with a different combination being connected to successive storage registers. The data transfer registers designated DTR1, DTR2 . . . DTRy, likewise receive unique pairs of A and B signals, the last one for register DTRy being $A_{15}$ $B_{15}$. The third enabling signal t is that provided by the delay means 108 of FIG. 3.

A digital word from the computer is provided simultaneously to every one of the data registers 54 but will enter that one register which is receiving the address signal on the A B input. Once that information is stored in the proper register, it is presented to whatever device is connected to that particular register, be it a stimulus device 50, a measurement device 52, the switching matrix 63 or the interface 61, as in FIG. 2.

Each of the data transfer registers 66 are connected to a unique measurement device 52, interface 61, or the control and display means 75, and that information which is entered into the data transfer register will be transmitted back to the computer when that particular storage register receives the proper address signal on its A and B input.

In the example given, there are 256 possible storage registers, the majority of which will probably be data registers 54, since more of these are generally needed to not only set up the stimulus devices but also the switching matrix and measurement devices. Many test operations will not require the full capacity of storage registers, however, the apparatus can be easily tailored to suit any type of test to be performed with the commercially available programmable test devices by simply choosing the required number of identical data storage registers and the requisite number of identical data transfer registers. Thus, to tailor the buffer interface equipment to different test operation requirements is a relatively simple procedure.

Figure 5A:
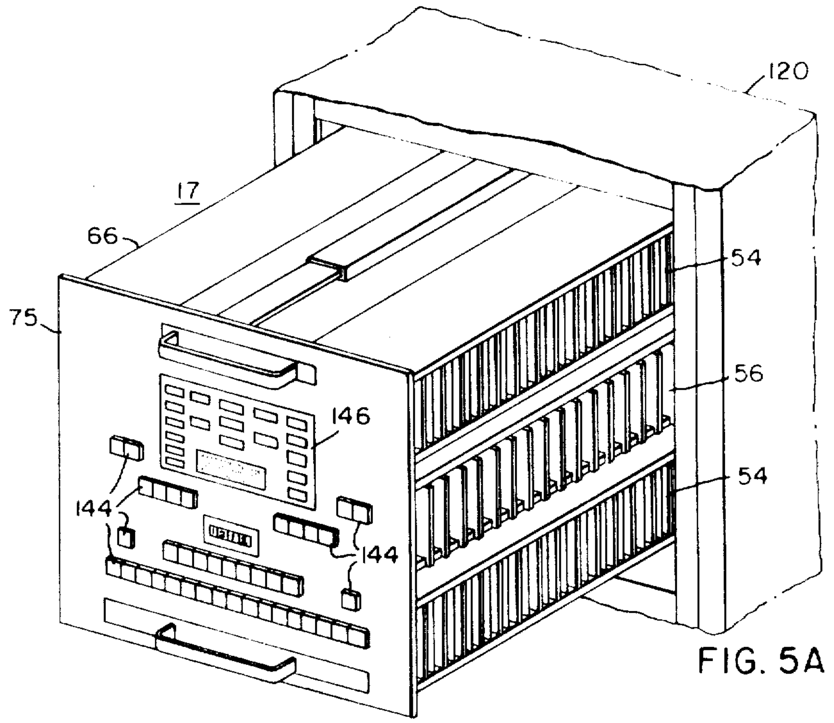
FIGS. 5A and 5B illustrate the buffer interface apparatus of FIG. 5 in positions for easy servicing.
Figure 5B:
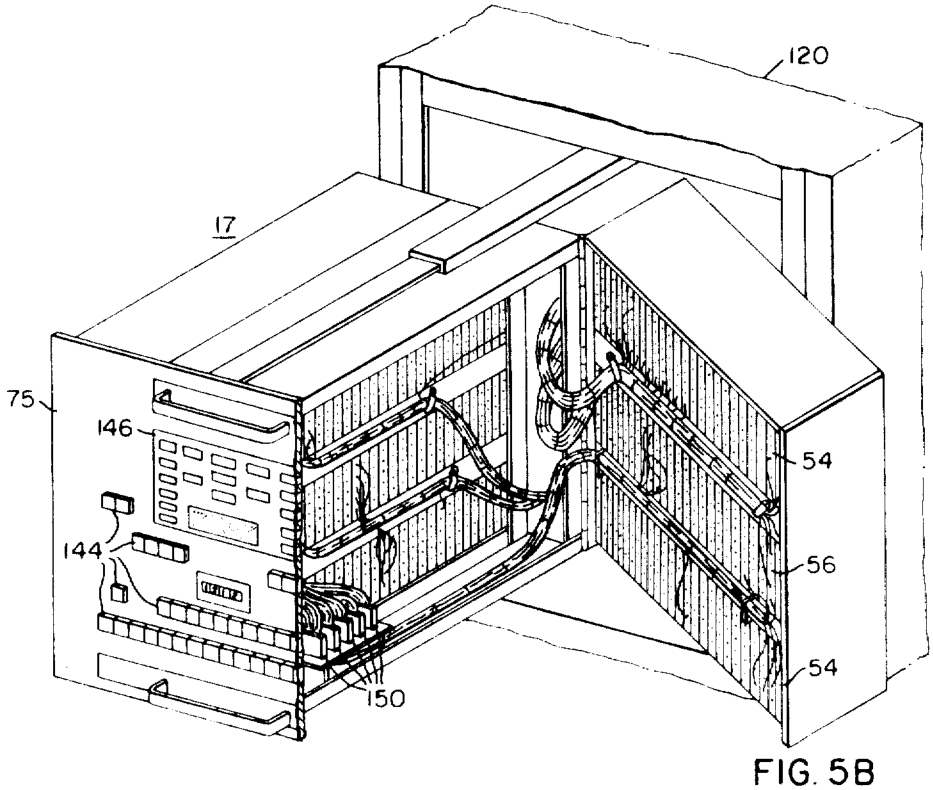
Figure 5:
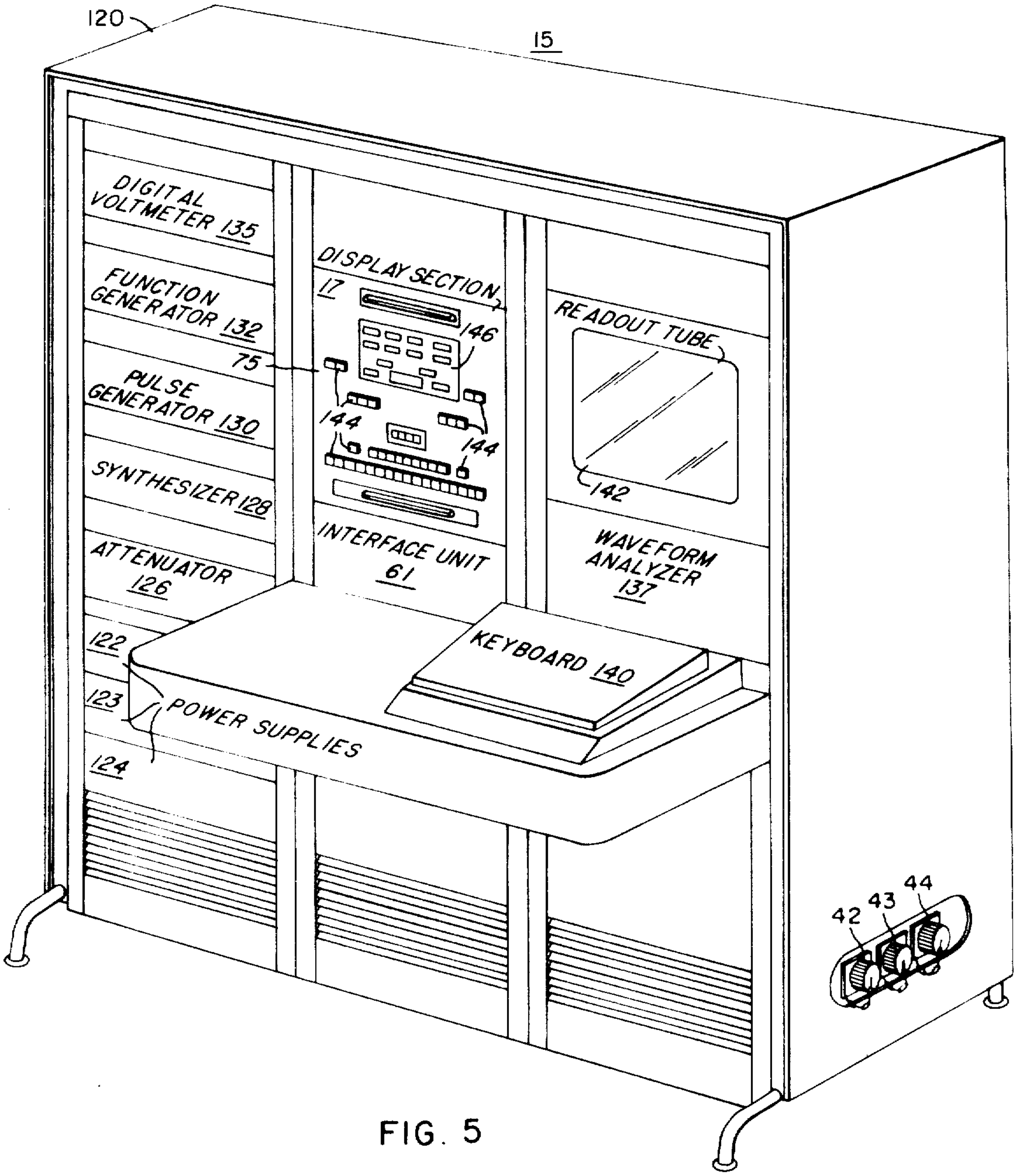
FIG. 5 is a view of a typical test station incorporating the present invention.

FIG. 5 is a perspective view of a typical test station such as illustrated in FIG. 2. The equipment is housed in a cabinet 120 and is connectable with the computer by way of first and second inputs 42 and 43 and output 44, all of which may be multiple pin connectors. Typical programmable stimulus devices include power supplies 122, 123, 124, attenuator 126, synthesizer 128, pulse generator 130, and function generator 132. Programmable measurement devices include a digital voltmeter 135 and a waveform analyzer 137.

Questions of, or instructions to, the computer may be initiated by keyboard 140 and response of the computer may be displayed on a cathode ray tube readout 142. These latter two units, if utilized, are preferably connected to the computer by a separate cabling arrangement.

The control and display section 75 of the buffer interface equipment includes a plurality of pushbuttons 144 in order to, for example, select registers for data insertion, select the data for insertion, and to communicate with the computer. Computer results on a particular test may be provided on display 146 which, in its simplest form, may be predetermined messages viewable when an associated lightbulb is turned on by the computer.

The buffer interface equipment is conveniently located in a centralized position behind control and display 75. For ease of servicing, as well as for setting up for different tests, the equipment is mounted on a slidable chassis which can be pulled out, as illustrated in FIG. 5A. The data registers 54 take the form of a plurality of plug-in printed circuit boards, which may readily be added or removed and the data transfer registers may be plug-in units on the left side of the chassis. The decode network 56 need not be changed for each different test, however, it is preferable that the circuitry thereof be on printed circuit boards for ease of maintenance.

The chassis swings open, as illustrated in FIG. 5B, to gain access to the interior. The front panel (a portion of which is broken away) is connected to various portions of the buffer interface by means of plug-in connections 150, which facilitates the removal and insertion of different panels.

Figure 6:
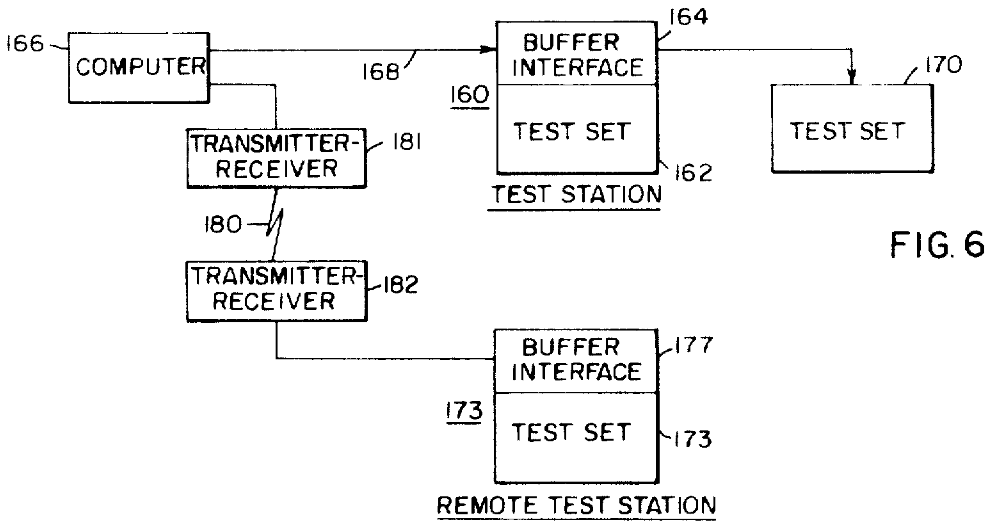
FIG. 6 illustrates various testing arrangements made possible with the buffer interface apparatus.

Various testing system arrangements are made possible with the provision of the buffer interface apparatus. FIG. 6 illustrates several such arrangements. A conventional setup is a test station 160 having a plurality of programmable test devices in the test set 162 and having a buffer interface 164. Communication is made with computer 166 by means of line 168, which in actuality would be comprised of three lines, such as 38, 39, and 40, in FIG. 2. Line 168 can be connected with other test stations having buffer interface equipment, as previously illustrated in FIG. 1, however, if the test set 162, does not require all the storage register capacity of buffer interface 164, the unused storage registers may be utilized to operate a remote test set 170.

In another arrangement, a remote test station 173 having both a test set 175 and buffer interface 177, is communicative with the computer 166 by a communications link 180 having a transmitter receiver 181 at the computer location and a transmitter receiver 182 at the remote test station location. The communication link 180 may be by telemetry methods, or by electro-acoustic methods, incorporating, for example, telephone lines.

We claim as our invention:

1. Apparatus for performing digital computer controlled test operations utilizing programmable test devices, a buffer interface, said buffer interface comprising:

a. first, second and third connections for digital signal communication with respective input/output channels of said computer;

b. a first section having a first plurality of storage registers for receiving information from said computer via said first connection and for transmitting said information to a predetermined ones of said test devices;

c. a second section having a second plurality of storage registers for receiving test operation results from predetermined ones of said test devices and for transmitting said results back to said computer via third connections; and d. a decode network for receiving address information from said computer via said second connection and operable in response thereto to provide address signals to said first and second sections, i. for selectively addressing one of said first plurality of storage registers to enable it to accept said information from said computer, and ii. for selectively addressing one of said second plurality of storage registers to enable it to transmit said results back to said computer.

2. Apparatus according to claim 1 which includes:

a. line receiver means connected in circuit between said first connection and said first section and said second connection and said decode network for amplifying and shaping said digital signals transmitted by said computer; and b. line driver means connected in circuit between said third connection and said second section for amplifying and shaping the digital signals transmitted back to said computer.

3. Apparatus according to claim 1 wherein said decode network includes:

a. a temporary storage for receiving a computer designated storage register address;

b. an address decode section operatively connected to said temporary storage for providing a unique address signal to enable one of said storage registers in said first or second plurality and c. means for providing an enabling signal ($t$) to all said storage registers during the provision of said unique address signal.

4. Apparatus according to claim 1 wherein said buffer interface is part of a test station and said decode network includes:

a. station decode means for decoding a computer generated station address for enabling said buffer interface.

5. A computer controlled testing system comprising:

a. buffer interface means for digital signal transfer relationship with said computer;

b. a plurality of digitally programmable test stimulus and test measurement devices;

c. means for connecting said devices with a unit to be tested;

d. said buffer interface means including a first plurality of storage registers for receiving information from said computer, said storage registers being selectively connected with said devices for programming said devices in accordance with said information;

e. said buffer interface means including a second plurality of storage registers selectively connected with said measurement devices for receiving the results of test operations and transmitting said results back to said computer;

f. said buffer interface means including addressing means responsive to a computer designated address for selectively enabling one of said first plurality of storage registers to receive said information or one of said second plurality of storage registers to transmit said results.

6. Apparatus according to claim 5 wherein said connecting means includes:

a. an interface section for making electrical contact with a unit under test; and b. a switching matrix operatively connected with said devices for establishing predetermined conductive paths between said devices and said unit under test.

7. Apparatus according to claim 6 which additionally includes:

a. means directly connecting at least one of said first plurality of storage registers and at least one of said second plurality of storage registers with the interface section of said connecting means.

* * * * *